Dec. 25, 1951  P. G. DRONG  2,579,556
VEHICLE BOGIE SUSPENSION
Filed Feb. 13, 1950

INVENTOR
P. G. DRONG
BY
Richard P. Cardew
AGENT

Patented Dec. 25, 1951

2,579,556

UNITED STATES PATENT OFFICE 2,579,556

VEHICLE BOGIE SUSPENSION

Peter G. Drong, Hibbing, Minn.

Application February 13, 1950, Serial No. 143,894

5 Claims. (Cl. 280—104.5)

This invention relates to vehicles having a rear, tandem-axle bogie, and has special reference to a bogie which automatically facilitates the steering of the vehicle.

In motor truck vehicles which haul heavy loads, it is common practice to provide the vehicle with an auxiliary set of wheels rearwardly of, and in alignment with, the usual rear wheels to receive part of the load. Vehicles provided with such auxiliary wheels are difficult to steer, as is commonly known. The steering of these vehicles produces forces which subject parts of the vehicle to great strain when the vehicle is moving in a curved path because the rear portion of the vehicle can not pivot simultaneously on two points, that is, on each of the wheels of the bogie on the inside of the turn. Obviously, the tires of the wheels must be dragged laterally of the vehicle when a turn is made, as the tandem wheels oppose any force tending to change the direction of the vehicle's travel from a straight path. This is the cause of difficult steering and terrific undue wear on the vehicle's tires, front and rear, due to scuffing.

One of the principal objects of my invention is to overcome the steering difficulties encountered with vehicles having tandem axle rear bogies.

Another object is to eliminate the undue wear and scuffing of tires on such vehicles.

Another object is to provide a novel means for suspending the tandem bogie of a vehicle to permit lateral flexibility between the vehicle chassis and the bogie, thereby aiding in the steering of the vehicle.

Another, more specific, object is to install a tandem bogie on a vehicle so that the forward axle and wheels of the bogie may shift from side to side to facilitate the steering of the vehicle and to eliminate the dragging of the wheels when making a turn.

Another object is to provide means to turn a tandem axle vehicle in a shorter radius without the difficulties encountered in steering common tandem-axle vehicles.

A further object is to provide a simplified bogie that will lend itself to automatic or self steering, the construction comprising coil spring suspension, torque arms, and weight equalizing beams of cooperative construction and association.

These and other objects and advantages will become more apparent as the description of my invention proceeds.

In the accompanying drawing forming a part of this application:

Figure 1:
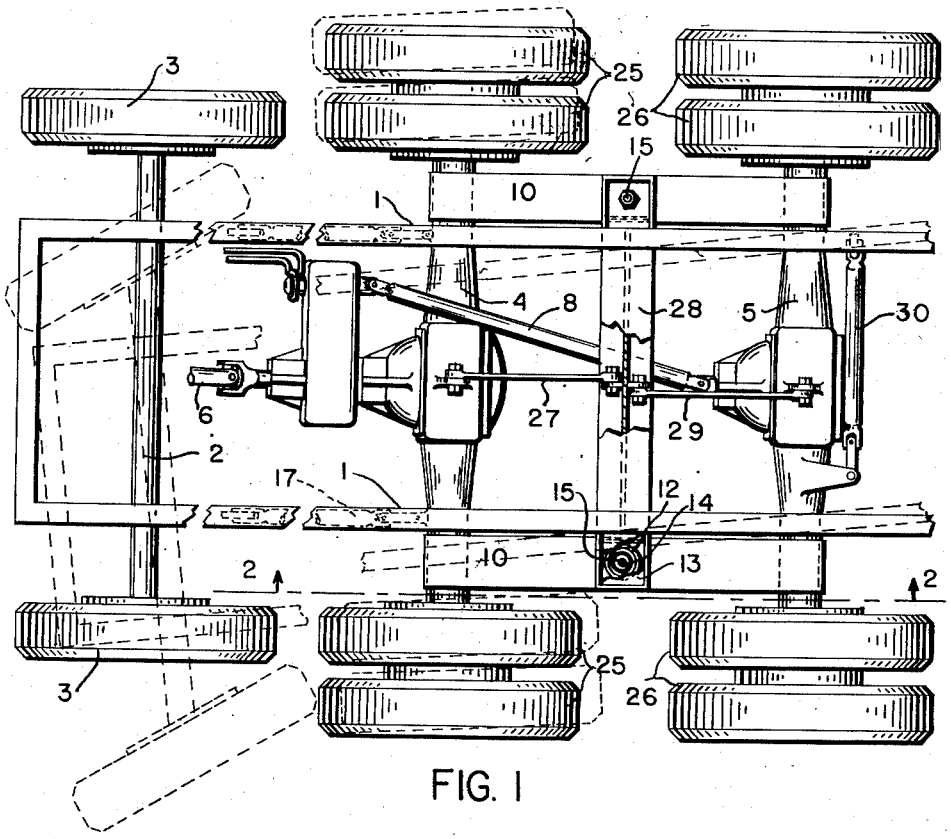
Fig. 1 is a broken top plan view of a vehicle chassis equipped with my invention.
Figure 2:
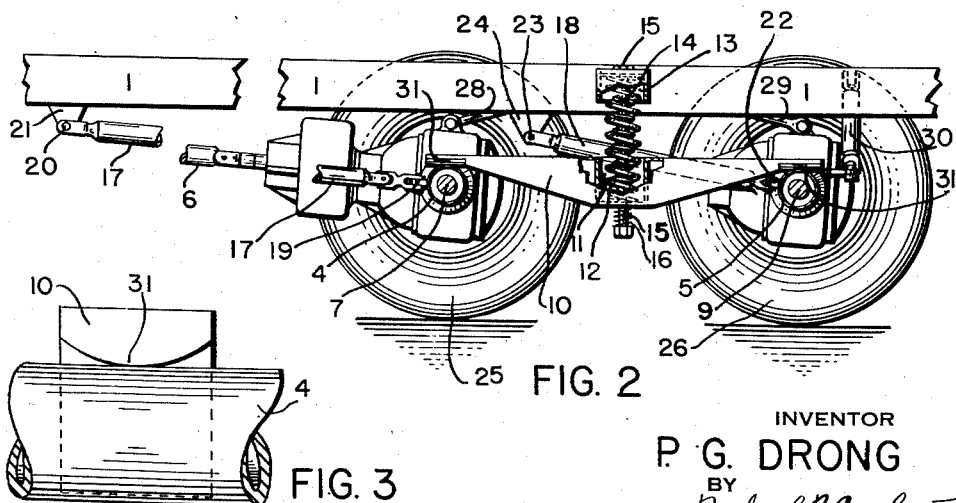
Fig. 2 is a sectional view on the line 2—2 Fig. 1 with parts broken away.

In the drawing, the reference numeral 1 indicates the chassis of the vehicle, 2 indicates the front axle thereof, and 3—3 indicates the front wheels thereof.

The numeral 4 indicates the housing of the foremost one of the tandem rear axles, and 5 indicates the housing of the rearmost one of the tandem rear axles. A drive shaft 6 is provided to drive the foremost axle 7, and an auxiliary drive shaft 8 may be provided, if desired, to drive the rearmost axle 9, all of which is conventional.

To suspend the chassis on the rear bogie, I employ a pair of trusses or equalizing beams 10 which are laid across the top of the axle housings 4 and 5 in alinement with each other and the chassis. The beams are, preferably, bridge-type, as shown. The upper faces of the beams 10 extend substantially straight between the two axles, however, the lower faces of the beams are built to provide the strength required to support the weight to be carried, and this results in the beams being underslung between the axles, as shown.

Centrally between the axles, a pocket 11 is provided in the beams, the pocket being the full depth of the beam, as shown. A coil spring 12 of the compression type is carried in the pocket 11 and extends outwardly from same. This spring supports the weight of the load, and distributes, or equalizes the load between the axles. The spring is secured to the chassis by means of an inverted cup or pocket 13 fixed to the chassis 1 immediately above the pocket 11. If desired, a second coil spring 14 may be mounted within the spring 12 to assist in supporting the load, and, preferably, this second or inner spring would be a little longer than the outer spring 12 so that it would provide the supporting means for the chassis when the vehicle is not loaded, thus providing better riding qualities for the vehicle when empty. A bolt 15 may be provided to extend through the base of each pocket 11 and 13 and through the centers of the coil springs to limit the upward movement of the chassis in relation to the beams 10, and a cushioning spring 16 is preferably provided to cushion the stopping action of the bolt 15. This bolt will eliminate the possibility of the springs ever coming out of their respective pockets or sockets unless they are purposely taken out by a mechanic.

Having the chassis thus supported I provide torque arms 17 and 18 to take the torque of the rear axles 7 and 9 respectively. The arms 17 are pivotally secured to the housing 4 as at 19, preferably directly beneath the chassis, and are pivotally connected to the chassis as at 20, as by a bracket 21 extending from the chassis. The torque arms 18 are pivotally secured to the housing 5 as at 22, and to the chassis as at 23 by means of a bracket 24, the arms 18 being in alinement with and directly under the chassis as are the arms 17.

The forward torque arms 17 are considerably longer than the rear torque arms 18. This is due to the fact that the foremost wheels 25—25 and axle 7 are allowed to move to one side or the other when the vehicle is turned, while the rearmost wheels 26 are prevented, as much as possible, from moving to one side or the other as the vehicle is turned, the reasons for which will become apparent.

To complete my installation, I prefer to pivotally mount an auxiliary torque arm 27 between the differential housing of the axle 7 and the I-beam 28 which extends across the longitudinal members of the chassis 1 intermediate the pockets 13, and a second auxiliary torque arm 29 between the I-beam 28 and the differential housing of the axle 9. These auxiliary torque arms are provided to keep the housings 4 and 5 from a rolling radii when torque power or the brakes are applied. A stabilizer 30 is connected by flexible ends from the housing 5 to the chassis, the arm being substantially parallel with the axle 9 and at right angles to the chassis as shown, to prevent the lateral movement of the rearmost axle and wheels of the bogie.

Figure 3:
Fig. 3 is a front elevational view of the truss or beam illustrating how it rests on the axle housing.

With the construction here shown and described, a vehicle will travel down the road in a straight line as usual, even though the rear axles are so suspended that lateral movement is possible on the coil springs. The stabilizer 30 and short torque arms 18 hold the rear axle and set of wheels from pivoting in respect to the chassis, however, the long torque arms 17 and the absence of a stabilizer arm will permit the forward wheels and axle of the bogie to move laterally in respect to the chassis. In order for the axles and wheels to move laterally, the equalizer beams 10 merely rest on the axle housings 4 and 5, and the faces of the beams which rest on the housing are rounded or convex as at 31 so that there is only point contact between the beams and the housings 4 and 5, as shown in Fig. 3. This point contact provides the least possible resistance so that the axle housings may slide or roll or pivot under the convex face of the beam to permit the wheels 25 and their axle to move laterally of the chassis. The sliding movement between the convex beam ends and the axle housings is quite small, of course, however, it does aid in the turning of the vehicle into and through a curved path, and absorbs or alleviates much of the strain and stress which is applied to parts of the vehicle during turning.

The coil springs also assist in permitting the bogie to move or turn in respect to the vehicle chassis as they can twist and bend freely and thereby absorb much of the excessive strains and stresses which are applied to parts of the vehicle when it is turned to and through a curved path.

It is deemed apparent that as the vehicle is turned, the front wheels 3 are turned first. In present construction, the front wheels are directly in line with the rear wheels, and as they are turned to steer the vehicle, their point of contact remains in the same alinement with the rear wheels, and the tires may be scuffed or dragged before the vehicle actually begins its turn, as the rear wheels have a tendency to keep going straight, and the front wheels must force the vehicle through the turn in plow-like fashion. Then, at least one set of the tandem wheels must be dragged through the turn.

However, in my construction, as the front wheels are turned to steer the vehicle in a curved path, the wheels move in the curved path immediately and the chassis follows readily, as the chassis may pivot or "twist" on the coil springs and the beams 10 as previously described even though the rear wheels keep going straight a short distance. The front wheels 3 are thus moved out of line with the rear wheels as shown in dotted lines Fig. 1, bringing the wheels of the vehicle into an arcuate alinement which makes it much easier to negotiate the turn without dragging tires or causing any undue stress or strain. This action makes it possible to negotiate a much shorter turn without undue scuffing or dragging as in the previous construction.

In addition to the above, the fact that the torque arms 17 are materially longer than the torque arms 18 permits the wheels 25 to move laterally of the chassis, due to the stress of the vehicle's turning, the wheels 26 being held from such lateral movement by their short torque arms and the stabilizer arm 30, thereby automatically putting the three pairs of wheels into the required arcuate alinement to negotiate the turn. It will be noted that this turning action places the wheels 25, which are on the outside of the turn, in materially spaced relation to the chassis, while the wheels 25, which are on the inside of the turn, are closely adjacent the chassis, the chassis having twisted on the coil springs, and the wheels 25 having been forced out of normal alinement with the wheels 26 due to the stress of turning. The wheels and chassis automatically return to normal alinement when the vehicle is turned back to a straight course as they are lead by the torque arms 17 and tend to follow the path of least resistance which is, of course, in alinement with the line of movement of the vehicle.

Having thus described my invention, what I claim is:

1. In a vehicle having a chassis and tandem rear axles and housings therefor: means for suspending said chassis on said axle housings to provide automatic steering for the rear portion of said vehicle comprising, a pair of beams resting across said housings in spaced parallel relation, said beams having their central portion extending below the axis of said axles, a pocket in said chassis above each of said beams, a pocket in the central portion of each of said beams in alinement with said chassis pockets and extending to the lowermost extremity of said beams, a coil spring mounted intermediate alined ones of said pockets, said spring having an intermediate portion thereof free to flex in lateral directions, and torque arms extending from each of said housings to said chassis to control said axles.

2. In a vehicle, a chassis, tandem rear axles and housings therefor and means for suspending said chassis on said axle housings comprising, a pair of beams extending across said axle housings in spaced substantially parallel relation, a coil spring extending between the central portion of each of said beams and the portion of said chassis immediately thereabove, said springs being free to flex laterally, and torque arms extending from said housings to said chassis to control the relation of said axles to said chassis, and said beams being underslung so that said springs may have their base below the center of said axles.

3. The structure as set forth in claim 1 and the foremost ones of said torque arms being longer than the rearmost ones of said arms to permit the foremost axle to move laterally of said chassis.

4. Means to facilitate the steering of a vehicle having a chassis and a pair of tandem axles at the rearmost end thereof comprising: equalizer beams extending between said axles in spaced substantially parallel relation to each other, said beams having a loose engagement with said axles whereby they may pivot in at least three directions with relation to said axle, a coil spring extending between each of said beams and said chassis, said springs being free to flex laterally between said chassis and said beams, means to permit the lateral movement of the foremost one of said axles in respect to said chassis, and means to prevent lateral movement of the other of said axles in relation to said chassis, said engagement of said beams with said axles comprising a convex face on said beams in engagement with portions of said axles at substantially right angles thereto so that said beams may pivot in relation to said axles in at least three directions.

5. In a vehicle, a chassis, tandem rear axles and housings therefor and means for suspending said chassis on said axle housings comprising, a pair of beams extending across said axle housings in spaced substantially parallel relation, a coil spring extending between the central portion of each of said beams and the portion of said chassis immediately thereabove, said springs being free to flex laterally, and torque arms extending from said housings to said chassis to control the relation of said axles to said chassis, and said beams having their ends which engage said housings convex so that only point contact is made between said housings and said beams and whereby the point of contact of said ends on said housings may move laterally of said housings and said ends may pivot in more than two directions on said housings.

PETER G. DRONG.

REFERENCES CITED

The following references are of record in the file of this patent:

UNITED STATES PATENTS

| Number | Name | Date |
|---|---|---|
| 2,017,001 | Hocking | Oct. 8, 1935 |
| 2,103,381 | Perkins et al. | Dec. 28, 1937 |
| 2,193,567 | Pointer | Mar. 12, 1940 |
| 2,360,619 | Peterman | Oct. 17, 1944 |
| 2,361,166 | Ayers | Oct. 24, 1944 |
| 2,403,833 | Spangler | July 9, 1946 |
| 2,456,719 | Martin | Dec. 21, 1948 |
| 2,493,004 | Mackie | Jan. 3, 1950 |